US008756539B2

(12) United States Patent  
Elliott et al.

(10) Patent No.: US 8,756,539 B2  
(45) Date of Patent: Jun. 17, 2014

(54) NETLIST MAINTENANCE IN A CIRCUIT DIAGRAM

(75) Inventors: B. Alexander Elliott, Toronto (CA); Rodney A. J. Draaisma, Toronto (CA)

(73) Assignee: National Instruments Corporation, Austin, TX (US)

( * ) Notice: Subject to any disclaimer, the term of this patent is extended or adjusted under 35 U.S.C. 154(b) by 682 days.

(21) Appl. No.: 12/533,946

(22) Filed: Jul. 31, 2009

(65) Prior Publication Data

US 2011/0029945 A1     Feb. 3, 2011

(51) Int. Cl.  
  G06F 17/50     (2006.01)  
  G06F 9/45      (2006.01)

(52) U.S. Cl.  
  USPC ........... 716/102; 716/103; 716/100; 716/101; 716/106

(58) Field of Classification Search  
  None  
  See application file for complete search history.

(56) References Cited

U.S. PATENT DOCUMENTS

| | | | |
|---|---|---|---|
| 4,901,221 A * | 2/1990 | Kodosky et al. | 715/771 |
| 5,111,413 A * | 5/1992 | Lazansky et al. | 703/14 |
| 5,555,201 A | 9/1996 | Dangelo et al. | |
| 5,801,958 A | 9/1998 | Dangelo et al. | |
| 5,812,413 A * | 9/1998 | Matsushita | 716/102 |
| 5,828,580 A * | 10/1998 | Ho | 716/115 |
| 6,053,947 A * | 4/2000 | Parson | 703/14 |
| 6,128,768 A * | 10/2000 | Ho | 716/115 |
| 6,134,705 A * | 10/2000 | Pedersen et al. | 716/103 |
| 6,421,814 B1 * | 7/2002 | Ho | 716/113 |
| 6,530,073 B2 * | 3/2003 | Morgan | 716/102 |
| 6,574,779 B2 | 6/2003 | Allen et al. | |
| 6,577,992 B1 | 6/2003 | Tcherniaev et al. | |
| 6,807,520 B1 | 10/2004 | Zhou et al. | |
| 7,360,180 B2 | 4/2008 | Seno | |
| 7,478,028 B2 | 1/2009 | Ho et al. | |
| 7,568,178 B2 * | 7/2009 | Moriat | 716/56 |
| 2002/0162086 A1 * | 10/2002 | Morgan | 716/18 |

OTHER PUBLICATIONS

"NI Multisim—Working with Larger Designs/Transfer-Communication"; National Instruments; Jan. 2009; 86 pages.  
U.S. Appl. No. 11/465,072, entitled "Automatically Generating a Graphical Data Flow Program Based on a Circuit Diagram", by Timothy J. Hayles, filed Aug. 16, 2006.  
U.S. Appl. No. 11/609,928, entitled "User Defined Virtual Instruments in a Simulation Environment", by Kyle P. Gupton, Lingyun Pan, and Rajesh S. Vaidya, filed Dec. 13, 2006.

* cited by examiner

Primary Examiner — A. M. Thompson  
(74) Attorney, Agent, or Firm — Meyertons Hood Kivlin Kowert & Goetzel, P.C.; Jeffrey C. Hood; Joel L. Stevens (57) ABSTRACT

Maintaining a netlist while editing a circuit diagram. The circuit diagram may be displayed on a display. The circuit diagram may include a plurality of electronic components connected by nets and may also include modular block(s) which represent a circuit portion in a hierarchical fashion. A global netlist may be stored that includes information regarding the nets of the circuit diagram. User input may be received which modifies the circuit diagram. Accordingly, the global netlist may be updated in response to the user input modifying the circuit diagram. The circuit diagram may be updated on the display based on updating the global netlist. Receiving the user input and updating the global netlist and circuit diagram may be performed a plurality of times, in a dynamic fashion during edit time.

19 Claims, 6 Drawing Sheets

NETLIST MAINTENANCE IN A CIRCUIT DIAGRAM

FIELD OF THE INVENTION

The present invention relates to the field of simulation, and more particularly to a system and method for maintaining a netlist while editing a circuit diagram.

DESCRIPTION OF THE RELATED ART

Simulation environments have developed which allow users to simulate and interact with various systems. For example, some simulation packages allow users to generate various electrical systems, e.g., electrical circuits, and interact with those circuits in a simulation environment. However, these simulation packages often require compilation processes whose netlists are different than those presented to the user during edit time. Accordingly, improvements in simulation environments are desired.

SUMMARY OF THE INVENTION

Various embodiments are presented of a system and method for maintaining a netlist while editing a circuit diagram.

A circuit diagram may be displayed on a display. The circuit diagram may include a plurality of electronic components connected by nets (e.g., displayed as lines in the circuit diagram). The circuit diagram may also include one or more modular blocks which represent a circuit portion in a hierarchical fashion. The circuit diagram may be displayed during edit time, e.g., is displayed as the user is creating or assembling the circuit diagram on the display.

A global netlist may be stored that stores information regarding the nets of the circuit diagram. For example, the global netlist may list each of the nets of the circuit diagram as well as information associated with the nets. For example, the global netlist may be created/stored in response to user input assembling the circuit diagram on the display.

User input may be received which modifies the circuit diagram, e.g., during the editing process. For example, the user may add and connect a modular block to the circuit diagram and this process may modify at least one net of the circuit diagram. Alternatively, or additionally the user may add a new net to the circuit diagram. Adding a new net may be performed by adding new wires or by deleting an object of the circuit diagram to split an existing net in two. In some embodiments, the user may also remove a net from the circuit diagram. Deleting a new net may be performed by removing a net or by joining two nets together.

Accordingly, the global netlist may be updated in response to the user input modifying the circuit diagram. In some embodiments, updating the global netlist may include analyzing the circuit diagram based on the modification to the circuit diagram and determining names for the nets of the circuit diagram based on the analysis. The global netlist may then be updated based on the determined names for the nets. In one embodiment, determining names for the nets may include using a set of rules. For example, the set of rules may be used to determine a name for a first net in the circuit diagram. There may be at least two possibilities for the name for the first net and the rules may be used to determine which of the at least two possibilities is used. Thus, the set of rules may define a priority of net names. For example, the set of rules may be based on how the possible names are assigned. Different assignments may include ground assignment, global connector assignment, user assignment, virtual connector assignment, hierarchical connector assignment, off-page connector assignment, or automatic number assignment. In some instances, e.g., where the rules do not provide a single name, user input may be requested/received which specifies a name for the net.

The circuit diagram may then be updated on the display after updating the global netlist. More specifically, the circuit diagram may be updated based on the updated global netlist. For example, updated names from the global netlist may be displayed in the circuit diagram.

Receiving user input, updating the global netlist, and updating the circuit diagram may be performed a plurality of times in a dynamic fashion during edit time. In other words, during user creation of the circuit diagram at edit time, in response to each step of user input to create or modify the circuit diagram, the above method may be performed, where the global netlist is updated and display of the circuit diagram may also be accordingly updated.

Thus, when the user has completed the process of editing the circuit diagram, the above method of maintaining/updating the global netlist, and updating the circuit diagram accordingly, results in a circuit diagram that is ready for compilation without requiring resolution of netlist names. Thus a flattening process is not required at compile time based on the updating of the global netlist and circuit diagram.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. patent application Ser. No. 11/609,928 titled "Coupling a Virtual Instrument to a Circuit Diagram," filed on Dec. 13, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1A:
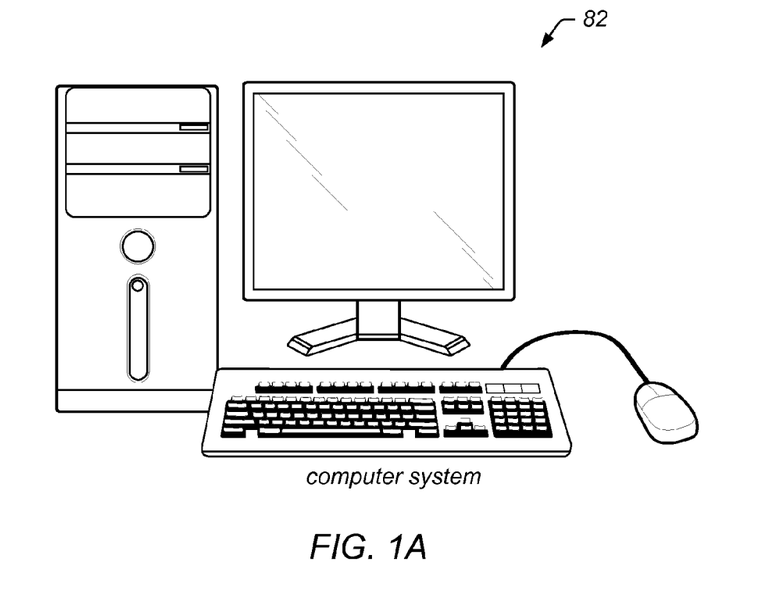
FIG. 1A illustrates a computer system that may implement an embodiment of the present invention.

FIG. 1A—Computer System

FIG. 1A illustrates a computer system 82 operable to allow for maintaining a netlist while editing a circuit diagram.

As shown in FIG. 1A, the computer system 82 may include a display device operable to display a circuit diagram as the circuit diagram is created and/or simulated. The display device may also be operable to display a graphical user interface or front panel of the circuit diagram during simulation of the circuit diagram.

The computer system 82 may include at least one memory medium on which one or more computer programs or software components according to one embodiment of the present invention may be stored. For example, the memory medium may store one or more simulation environments which are executable to perform the methods described herein. For example, the memory medium may store a circuit diagram development environment application used to create and/or simulate circuit diagrams. The memory medium may also store operating system software, as well as other software for operation of the computer system. Various embodiments further include receiving or storing instructions and/or data implemented in accordance with the foregoing description upon a carrier medium.

Figure 1B:
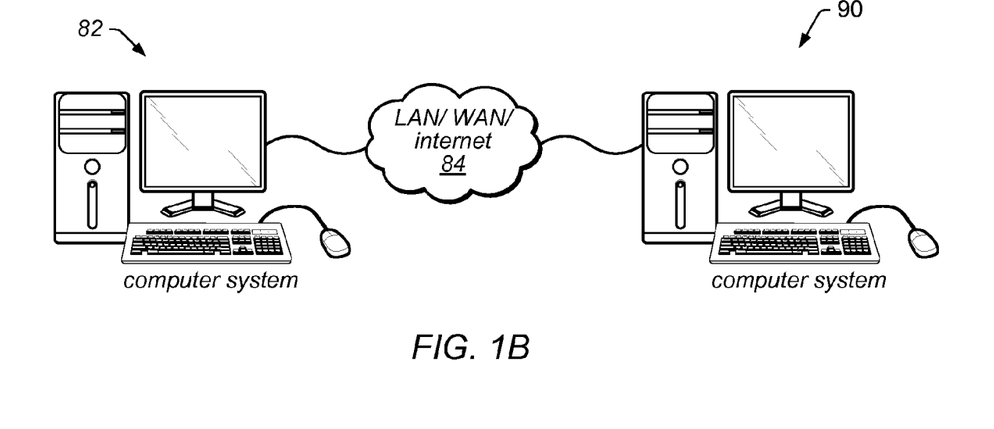
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may simulate (or execute) a circuit diagram in a distributed fashion. For example, computer 82 may simulate a first portion of the circuit diagram and computer system 90 may simulate a second portion of the circuit diagram. As another example, computer 82 may display the graphical user interface, e.g., a front panel, of a circuit diagram and computer system 90 may simulate the circuit diagram. Thus, the simulation environment may be executed across one or more computer systems, e.g., the computer system 82 and the computer system 90.

In one embodiment, the circuit diagram may be used to create a netlist which may be used to configure a programmable hardware element, e.g., in a device. The netlist may also be used for implementation in an application specific integrated circuit (ASIC), as desired. In further embodiments, a device, e.g., including a programmable hardware element, may be used to assist in simulating the circuit diagram.

Exemplary Systems

Embodiments of the present invention may be involved with performing test and/or measurement functions with simulated systems (e.g., circuits); controlling and/or modeling instrumentation or industrial automation hardware which may interact with simulations (e.g., circuit simulations); modeling and simulation functions, e.g., modeling or simulating a device or product being developed or tested, etc. Exemplary test applications where the virtual instrument may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications.

Figure 2:
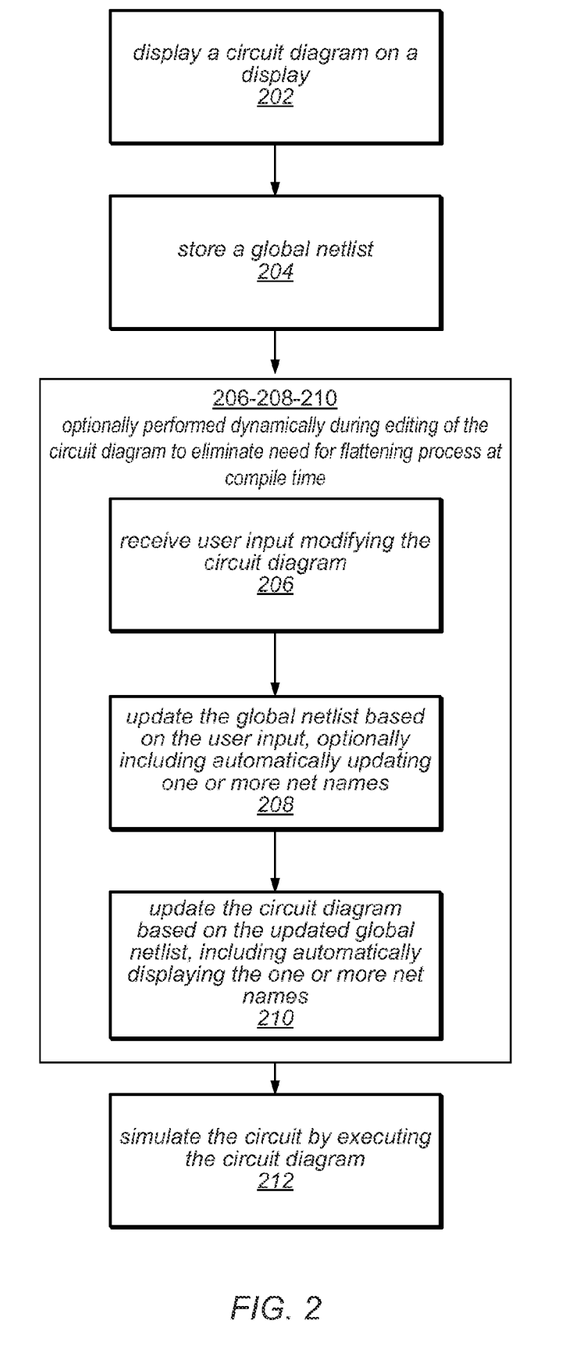
FIG. 2 is a flowchart diagram illustrating embodiments of a method for maintaining a netlist while editing a circuit diagram, according to one embodiment.

FIG. 2—Maintaining a Netlist While Editing a Circuit Diagram

FIG. 2 is a flowchart illustrating an exemplary method for maintaining a netlist while editing a circuit diagram. The method shown in FIG. 2 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 202, a circuit diagram may be displayed on a display, e.g., of the computer system 82, in response to user input. The circuit diagram may include a plurality of icons connected by lines. The icons may represent electronic components, and the lines may represent nets that connect the electronic components. The nets may eventually represent wires or copper traces in a final circuit, e.g., being designed using the circuit diagram. The nets may be assigned names explicitly by the user, from special connections to ground or power from hierarchical connectors, or automatically assigned an arbitrary unique number by software. As described below, the names of the nets may be stored in a global netlist and may be updated in a dynamic fashion during edit time.

The circuit diagram may also include one or more modular blocks which represent a circuit portion in a hierarchical fashion. For example, in a large design, the user may often choose to arrange the circuit diagram in such a hierarchical manner, where commonly used sub-elements are represented by the modular block(s). Each block may be repeated multiple times through the design, in each instance, connected to different nets in the circuit diagram. Blocks may be nested arbitrarily deeply within the hierarchy, provided no circular dependencies are created.

Connections through levels in the hierarchy (or amongst separate pages at the same level of hierarchy, e.g., for a multi-page block) may be achieved through explicit connector objects included in the circuit diagram. However, it should be noted that the connectors may not correspond to any physical components or devices in the final manufactured circuit board and may be functionally similar to "invisible wires" connecting the nets in different blocks or pages. The modular blocks may be stored in the same file as the circuit diagram and/or may be stored separately, as desired. Thus, the circuit diagram may visually represent a circuit, e.g., the functionality of the circuit.

In some embodiments, the circuit diagram may be displayed in response to user input, e.g., creating the circuit diagram. The user input may include configuring or assembling the circuit diagram manually. For example, the user may be able to drop circuit elements and/or modular blocks selected from a dialog box displayed in a GUI in the simulation environment. The user may also connect these icons to form a circuit diagram. Additionally, or alternatively, the user may create the circuit diagram via other methods. For example, the user may input criteria or otherwise specify functionality of the circuit diagram to a GUI, and in response to the user input, the circuit diagram may be automatically created. However, in one embodiment, the user input may simply open a previously generated or specified circuit diagram. Note that other inputs are envisioned. Thus, the circuit diagram may be displayed in response to various user inputs.

In 204, a global netlist may be stored, e.g., with the full circuit diagram file, that stores information regarding the nets of the circuit diagram. For example, the global netlist may list each of the nets of the circuit diagram as well as information associated with the nets. Note that in some embodiments, this global netlist may be automatically recalculated when the circuit design file is loaded if independent changes have been made to the externally stored hierarchical blocks. For example, the global netlist may have been created/updated based on prior user input creating the circuit diagram, according to the methods described herein (e.g., in steps 206 and 208).

In 206, user input may be received which modifies the circuit diagram. For example, the user may add and connect a modular block to the circuit diagram (or remove a modular block) and this process may modify at least one net of the circuit diagram. Alternatively, or additionally the user may add a new net to the circuit diagram. Adding a new net may be performed by adding new wires or by deleting an object of the circuit diagram to split an existing net in two. In some embodiments, the user may also remove a net from the circuit diagram. Deleting a net may be performed by removing a net or by joining two nets together. Further editing actions are envisioned, such as adding or modifying connector objects, among other available modifications.

In 208, the global netlist may be updated in response to the user input modifying the circuit diagram. More particularly, the global netlist may be updated whenever user input is received which modifies a net in the circuit diagram. Thus, where the user input adds or removes a net, as described in 206 above, the global netlist may be updated. More specifically, updating the global netlist may takes all electrical connections (through hierarchical connectors, off-page connectors, global connectors, or on-page connectors) into account. In some embodiments, updating the global netlist may include analyzing the circuit diagram based on the modification to the circuit diagram and determining names for the nets of the circuit diagram based on the analysis. The global netlist may then be updated based on the determined names for the nets.

In one embodiment, determining names for the nets may include using a set of rules. For example, the set of rules may be used to determine a name for a first net in the circuit diagram. There may be at least two possibilities for the name for the first net and the rules may be used to determine which of the at least two possibilities is used. Thus, the set of rules may define a priority of net names. For example, the set of rules may be based on how the possible names are assigned. Different assignments may include ground assignment, global connector assignment, user assignment, virtual connector assignment, hierarchical connector assignment, off-page connector assignment, or automatic number assignment. The names based on the assignments may be prioritized, e.g., in the order of the assignments listed above. Accordingly, the name with the highest priority may be assigned to the net. In some instances, e.g., where the rules do not provide a single name, user input may be requested and/or received which specifies a name for the net. A specific embodiment of the net name priority ranking is provided below.

In 210, the circuit diagram may then be updated on the display after updating the global netlist, based on any changes made to the global netlist. More specifically, the circuit diagram may be updated on the display to reflect any new or changed names that were determined in 208. Receiving user input, updating the global netlist, and updating the circuit diagram may be performed a plurality of times in a dynamic fashion during edit time. Thus, the names of the nets shown in the circuit diagram may be usable for simulation, laying out the physical components and copper traces of a printed circuit board, and configuring a programmable hardware element without an explicit flattening or compilation process.

It is noted that, in one embodiment, steps 206, 208 and 210 may be performed for each user editing operation of the circuit diagram. Thus, although step 202 presumes the existence of a circuit diagram, steps 206, 208 and 210 may have been performed for each of the editing operations used to create the circuit diagram.

In 212, the circuit diagram may be simulated, e.g., in the simulation environment. Thus, the circuit diagram may be executable to simulate the displayed circuit. The circuit may receive inputs and may provide outputs, e.g., from real world instruments and/or simulated systems, as desired.

In further embodiments, the circuit diagram may be implemented on a programmable hardware element, such as a field programmable hardware element (FPGA). Thus, the method may include using a netlist (e.g., the global netlist) to configure the programmable hardware element. Alternatively, or additionally, a hardware description program, e.g., implemented in Verilog, may be automatically generated based on the circuit diagram, and the programmable hardware element may be configured based on the hardware description program. The hardware description program may be used to configure or create a printed circuit board, as desired.

Figure 6:
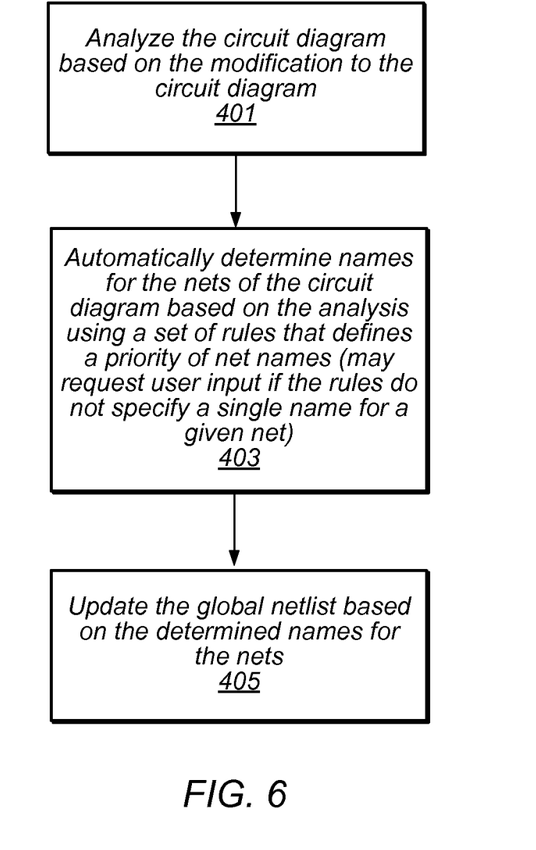
FIG. 6 is a flowchart diagram illustrating details regarding automatically determining names for the nets of a circuit diagram in response to a modification of the circuit diagram.

FIG. 6 is a flowchart diagram illustrating details regarding automatically determining names for the nets of a circuit diagram in response to a modification of the circuit diagram. As indicated in block 401, the circuit diagram may be analyzed based on the modification to the circuit diagram. As indicated in block 403, names for the nets of the circuit diagram may be automatically determined based on the analysis using a set of rules. In some embodiments the set of rules may define a priority of net names. (In some instances, e.g., where the rules do not provide a single name for a given net, user input may be requested/received which specifies a name for the net.)

Exemplary Net Name Priority

The following description provides an exemplary net name priority with corresponding description.

In the case that the user input in 206 results in a modification of one or more nets, rules may be used to update net names. For example, whenever two nets are connected, if they are in different net ranks, the higher ranked name may automatically preempt the lower ranked name. If two names of the same rank are connected, the user may be prompted to choose one to take priority unless the two nets are auto-numbered, in which case the merged net may be silently auto-numbered.

The priority for net names may be the following: Ground (always net "0"); names set by global connectors (e.g., including both internal global connectors such as "VCC" and user-defined global connectors); names assigned directly to the net by the user; names set by on-page (virtual) connectors; names set by hierarchical connectors; names set by off-page connectors; and auto-numbered nets (no user intervention may be required if these are connected).

With the exception of globally-named nets (e.g., nets defined by global connectors, the ground net, etc.) or auto-numbered nets (which are numbered uniquely throughout the design), all other net names may be prefixed by the block reference designator of the block from which they derived their name (e.g., where the connector is placed or where the user defined the name). The top level of the design may have no reference designator.

Because names may be "masked" and "unmasked" as connections are made or deleted, the netlist manager keeps track of all possible names for a net so that if a higher-ranked name is removed, then the next higher one can be used. In some embodiments, the user may be able to view this ranked list.

Figure 3:
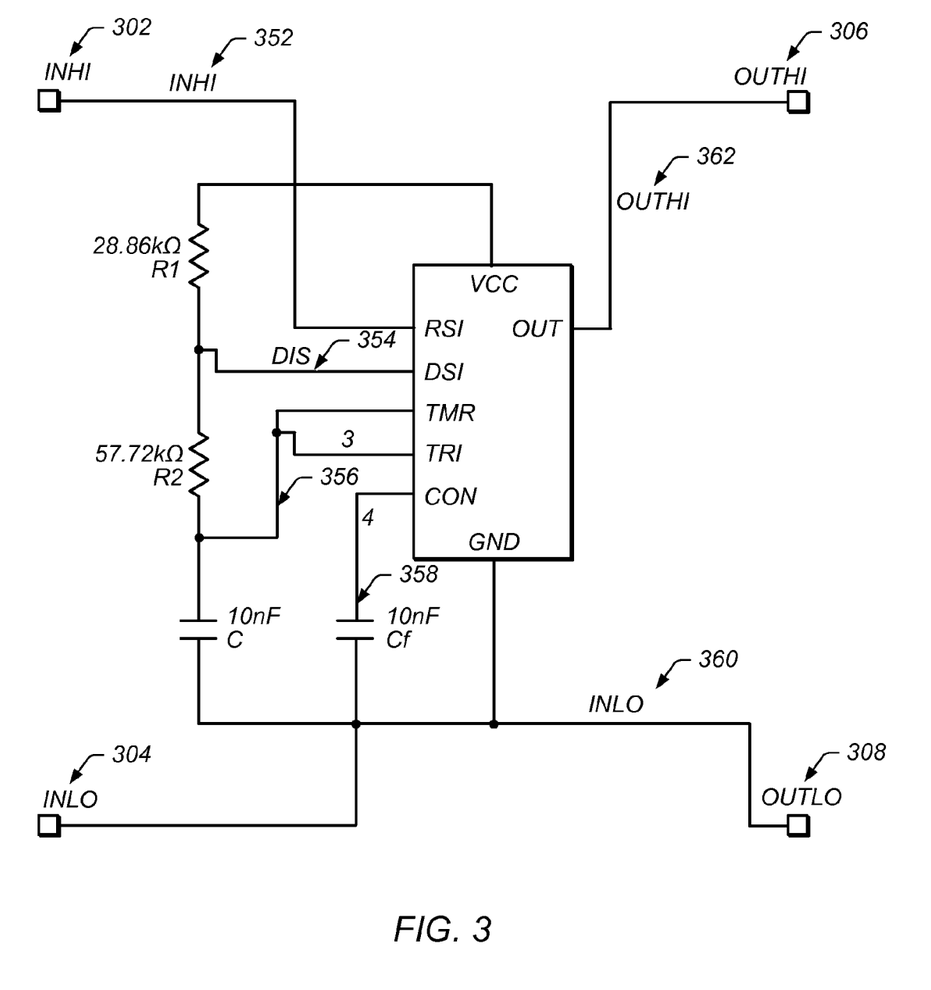
FIGS. 3-5 illustrate various circuit diagrams according to the method of FIG. 2, according to one embodiment.
Figure 4:
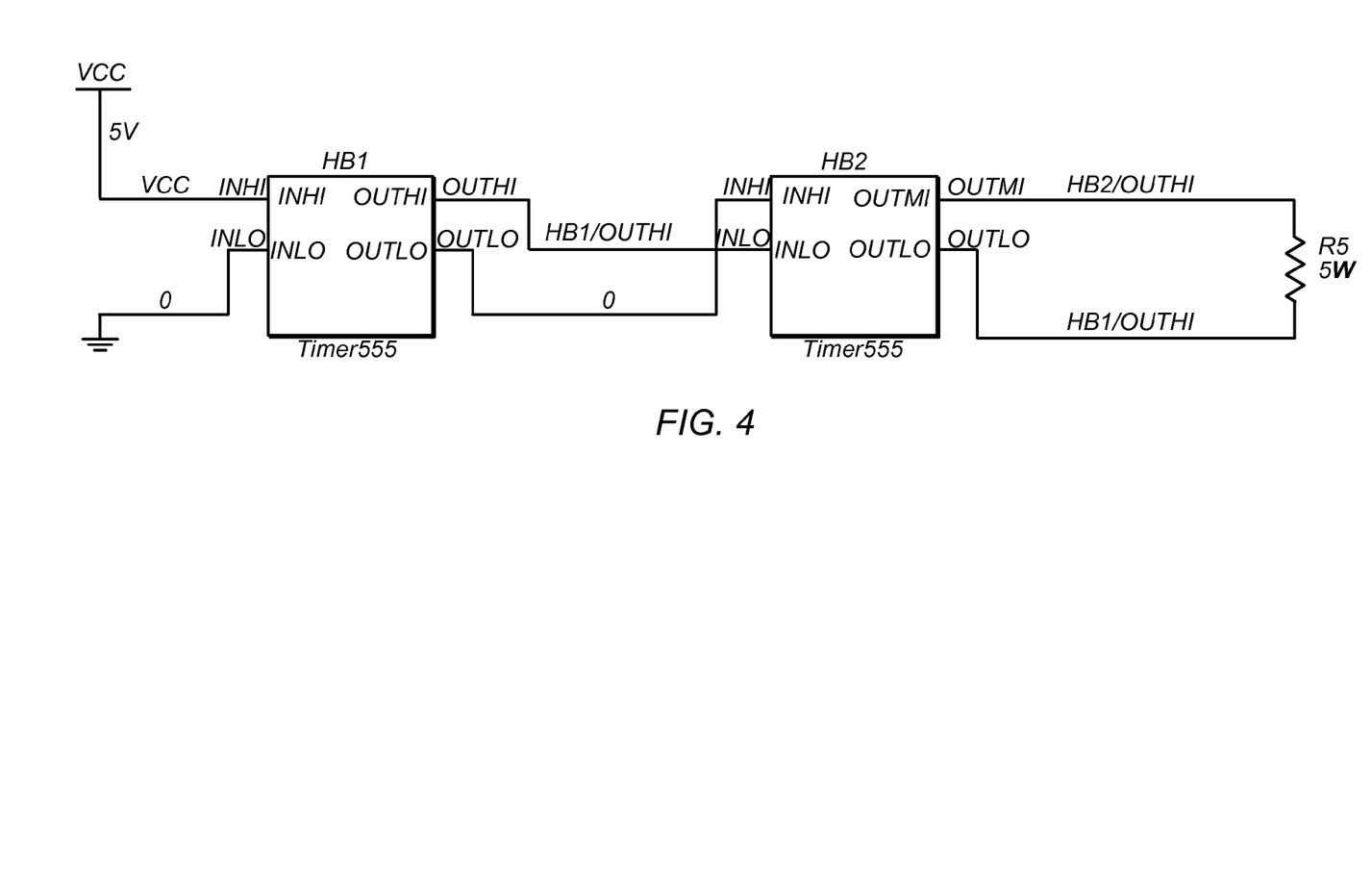
Figure 5:
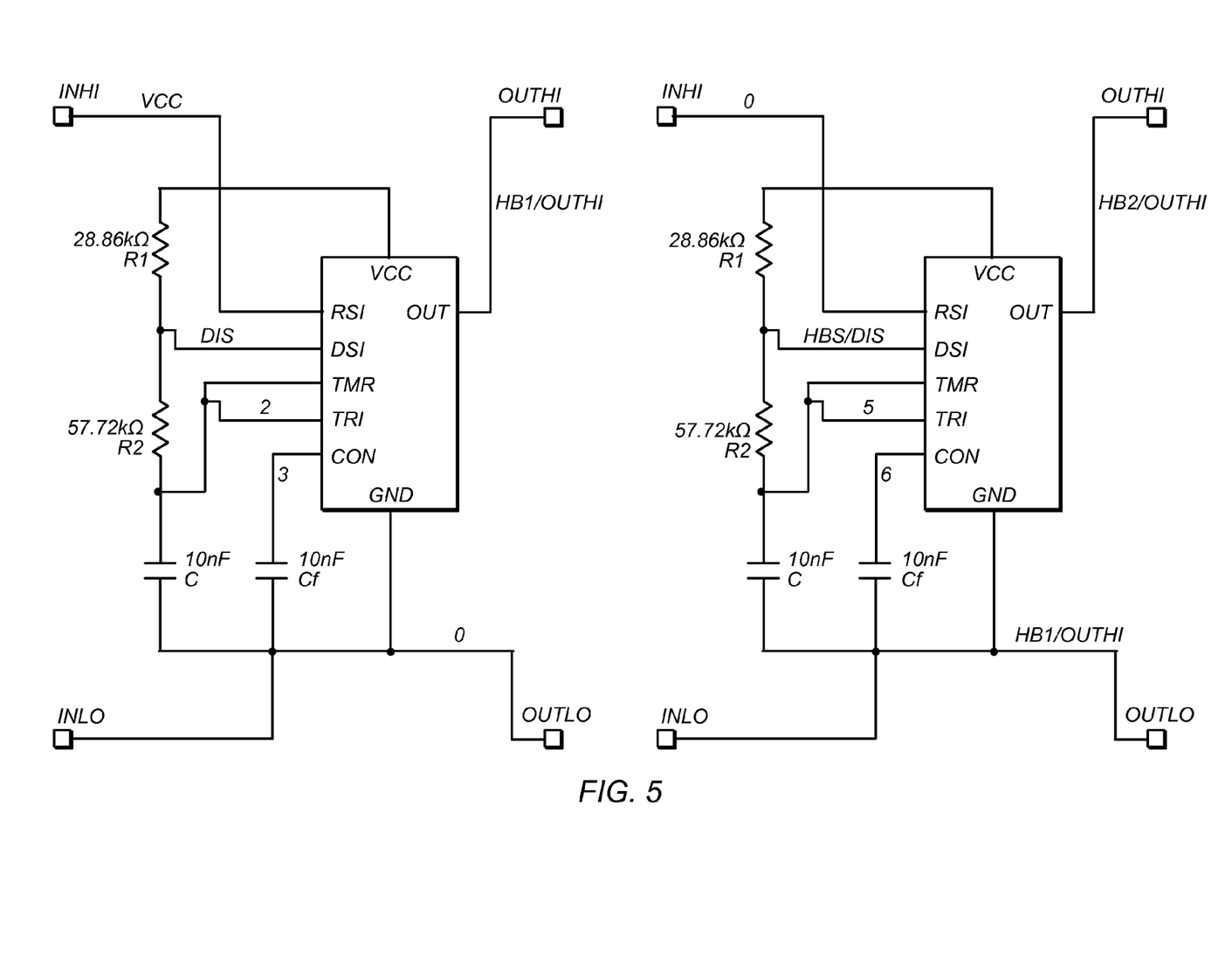

FIGS. 3-5 Exemplary Circuit Diagrams

FIGS. 3-5 provide exemplary circuit diagrams corresponding to the method of FIG. 2. Note that these are specific implementations that are exemplary only and that further variations are envisioned.

FIG. 3 illustrates a hierarchical block named "Timer555", which is shown in isolation (that is, not embedded in a larger design). As shown, Timer555 includes two input connectors, INHI 302 and INLO 304. Timer555 also includes two output connectors, OUTHI 306 and OUTLO 308. These connectors correspond to pins on the hierarchical block object placed within a design (as is shown in FIG. 4, described below).

In FIG. 3, the nets connected directly to the connectors take on the name of the connectors. However, when INLO 302 and OUTLO 308 conflict, the user may choose which name will take precedence since these have the same rank, or a name may be chosen automatically. In this example, Timer555 includes 6 nets, INHI 352, DIS 354, 3 356, 4 358, INLO 360, and OUTHI 362.

FIG. 4 illustrates a circuit diagram where two copies of Timer555 (labeled HB1 and HB2) are connected. As shown in this example, the power supply net "VCC" and the ground net "0" both take priority over any other net name. The ground net "0" propagates through the Timer555 HB1 instance and appears between the two blocks, even though no ground component is explicitly connected there. Finally, the nets that are named by the hierarchical connectors are prefixed by the instance reference designator of the HB instance ("HB1/" or "HB2/") to maintain uniqueness.

Finally, FIG. 5 illustrates two instances of the Timer555 block in context, which have been named according to an embodiment of the methods described herein. In this example, all nets that are connected to the I/O connectors have exactly the same name as the nets connected to block pins in the circuit diagram of FIG. 4. Therefore, any "flattening" operation (which may not be necessary according to the methods described herein) does not eliminate any names. The power supply "VCC" and the ground net "0" propagate into both HB instances, overriding the local names. The specially named net "DIS" is automatically given the "HB1/" or "HB2/" prefix to maintain uniqueness. When a name like "HB1/OUTHI" collides with another name of the same rank "HB2/INLO", the user may be prompted to choose which name takes priority or this may be selected automatically to avoid user frustration. The auto-numbered nets ("3" and "4" from FIG. 3) are automatically assigned unique numbers in each block ("2" and "3" in HB1 and "5" and "6" in HB2).

Thus, all of this adjustment may occur in real time as the user is wiring together the circuit, so upon export to simulation or printed circuit board (PCB) layout, no flattening step may be required. Additionally, all net names appearing in the various circuit block instances are exactly what may be used by the simulator or the PCB layout software.

Advantages

For simulation or printed circuit board (PCB) layout purposes, each electrical connection in the entire design must be assigned a unique identifier. This means that separate nets labeled with particular names that are copied throughout the design hierarchy typically have their names changed at some point as the connector objects are effectively removed and the nets in different blocks are electrically merged. In previous systems, once a circuit diagram was completed, a compilation process was required to achieve this net name resolution. As indicated above, conventionally, this was done in an explicit step immediately before export to simulation or PCB layout. This step may be called "flattening" or "compilation" and it results in a mapping where multiple net names in different contexts throughout the hierarchy end up mapped to the same net name in the final flattened output netlist. How the final net name is chosen can depend on various priorities amongst the various competing input names, but however it is chosen, some names that the user would see in the design could be destroyed and never appear in the output netlist, thereby confusing the user.

According to one embodiment of the invention as described herein, a global netlist is dynamically maintained that takes all electrical connections (through hierarchical connectors, off-page connectors, global connectors, or on-page connectors) into account. This allows the user to see, at all times, what his flattened netlist will look like, e.g., in the circuit diagram. This eliminates the need for an explicit flattening step before import that was previously required. Thus, copies of the same block in different locations within the design will have different net names, depending on their connection to the rest of the design. Additionally, using the rules described above, most naming may be performed automatically, with the user being presented with a choice of names only when names of equal rank conflict.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium storing program instructions, wherein the program instructions are executable to implement:
    displaying a circuit diagram on a display, wherein the circuit diagram comprises a plurality of electronic components connected by nets, wherein the circuit diagram comprises one or more modular blocks which represent a circuit portion in a hierarchical fashion;
    storing a global netlist that stores information regarding the nets of the circuit diagram;
    receiving user input modifying the circuit diagram, wherein said modifying comprises connecting a first net to a second net, wherein the first net and the second net each have a respective name;
    updating the global netlist in response to the user input modifying the circuit diagram, wherein updating the global netlist comprises automatically updating one or more names of one or more of the nets, wherein automatically updating the one or more names comprises automatically preempting the name of the first net with the name of the second net in response to determining that the name of the second net has a higher priority than the name of the first net; and
    updating the circuit diagram on the display after said updating the global netlist, wherein said updating is performed based on the information in the updated global netlist, wherein updating the circuit diagram comprises displaying the updated names;
    wherein said receiving user input, said updating the global netlist, and said updating the circuit diagram are performed a plurality of times, such that said updating the global netlist and said updating the circuit diagram are performed dynamically during edit time.

2. The non-transitory computer accessible memory medium of claim 1, wherein a flattening process is not required at compile time based on said receiving, said updating the global netlist, and said updating the circuit diagram being performed dynamically during edit time.

3. The non-transitory computer accessible memory medium of claim 1, wherein said automatically updating the one or more names of the one or more nets comprises:
    analyzing the circuit diagram based on the modification to the circuit diagram;
    determining names for the nets of the circuit diagram based on the analysis; and
    updating the global netlist based on the determined names for the nets.

4. The non-transitory computer accessible memory medium of claim 3, wherein said determining names for the nets comprises automatically selecting a particular name for a particular net from a plurality of possible names for the particular net.

5. The non-transitory computer accessible memory medium of claim 1, wherein the program instructions are further executable to determine that the name of the second net has a higher priority than the name of the first net according to set of rules that defines a priority of net names.

6. The non-transitory computer accessible memory medium of claim 5, wherein the set of rules defines the priority of net names based on one or more of: ground assignment, global connector assignment, user assignment, virtual connector assignment, hierarchical connector assignment, off-page connector assignment, or automatic number assignment.

7. The non-transitory computer accessible memory medium of claim 1, wherein the user input modifying the circuit diagram comprises user input adding and connecting a modular block to the circuit diagram.

8. The non-transitory computer accessible memory medium of claim 1, wherein receiving the user input modifying the circuit diagram comprises receiving user input adding a new net to the circuit diagram.

9. The non-transitory computer accessible memory medium of claim 1, wherein the user input is first user input modifying the circuit diagram a first time, wherein the program instructions are further executable to implement:
    receiving second user input modifying the circuit diagram a second time, wherein said modifying comprises connecting a third net to a fourth net, wherein the third net and the fourth net each have a respective name; and
    in response to determining that the name of the third net has a same priority as the name of the fourth net, prompting for user input selecting either the name of the third net or the name of the fourth net to take priority.

10. A method for editing a circuit diagram, comprising:
    receiving, by a computer system, user input modifying a circuit diagram on a display, wherein the circuit diagram comprises a plurality of electronic components connected by nets, wherein the circuit diagram comprises one or more modular blocks which represent a circuit portion in a hierarchical fashion, wherein said modifying comprises connecting a first net to a second net, wherein the first net and the second net each have a respective name;

updating, by the computer system, a global netlist in memory in response to the user input modifying the circuit diagram, wherein the global netlist stores information regarding the nets of the circuit diagram, wherein updating the global netlist comprises automatically updating one or more names of one or more of the nets, wherein automatically updating the one or more names comprises automatically preempting the name of the first net with the name of the second net in response to determining that the name of second net has higher priority than the name of the first net; and updating, by the computer system, the circuit diagram on the display after said updating the global netlist, wherein said updating is performed based on the information in the updated global netlist, wherein updating the circuit diagram comprises displaying the one or more updated names;

wherein said receiving user input, said updating the global netlist, and said updating the circuit diagram are dynamically performed by the computer system a plurality of times during edit time of the circuit diagram.

11. The method of claim 10, wherein a flattening process is not required at compile time based on said receiving, said updating the global netlist, and said updating the circuit diagram being performed dynamically during edit time.

12. The method of claim 10, wherein said automatically updating the one or more names of the one or more nets comprises:
analyzing the circuit diagram based on the modification to the circuit diagram;
determining names for the nets of the circuit diagram based on the analysis; and
updating the global netlist based on the determined names for the nets.

13. The method of claim 12, wherein said determining names for the nets comprises automatically selecting a particular name for a particular net from a plurality of possible names for the particular net 14. The method of claim 10, further comprising: determining that the name of the second net has higher priority than the name of the first net according to a set of rules defines a priority of net names.

15. The method of claim 14, wherein the set of rules defines the priority of net names based on one or more of: ground assignment, global connector assignment, user assignment, virtual connector assignment, hierarchical connector assignment off-page connector assignment, or automatic number assignment.

16. The method of claim 10, wherein the user input modifying the circuit diagram comprises receiving user input adding a new net to the circuit diagram.

17. The method of claim 10, wherein the user input is first user input modifying the circuit diagram a first time, wherein the method further comprises:
receiving, by the computer system, second user input modifying the circuit diagram a second time, wherein said modifying comprises connecting a third net to a fourth net, wherein the third net and the fourth net each have a respective name; and
in response to determining that the name of the third net has a same priority as the name of the fourth net, the computer system prompting for user input selecting either the name of the third net or the name of the fourth net to take priority.

18. A system, for editing a circuit diagram, comprising:
one or more processors;
a display coupled to the one or more processor; and
a memory medium coupled to the one or more processors, wherein the memory medium stores program instructions executable by the one or more processors implement:
displaying the circuit diagram on the display, wherein the circuit diagram comprises a plurality of electronic components connected by nets, wherein the circuit diagram comprises one or more modular blocks which represent a circuit portion in a hierarchical fashion;
storing a global netlist that stores information regarding the nets of the circuit diagram;
receiving user input modifying the circuit diagram, wherein said modifying comprises connecting a first net to a second net, wherein the first net and the second net each have a respective name;
updating the global netlist in response to the user input modifying the circuit diagram, wherein updating the global netlist comprises automatically updating one or more names of one or more of the nets, wherein automatically updating the one or more names comprises automatically preempting the name of the first net with the name of the second net in response to determining that the name of the second net has a higher priority than the name of the first net; and
updating the circuit diagram on the display after said updating the global netlist, wherein said updating is performed based on the information in the updated global netlist, wherein updating the circuit diagram comprises displaying the one or more updated names;
wherein said receiving user input, said updating the global netlist, and said updating the circuit diagram are performed a plurality of times, such that said updating the global netlist and said updating the circuit diagram are performed dynamically during edit time.

19. The system of claim 18, wherein the user input is first user input modifying the circuit diagram first time, wherein the program instructions are further executable by the one or more processors to implement:
receiving second user input modifying the circuit diagram a second time, wherein said modifying comprises connecting a third net to a fourth net, wherein the third net and the fourth net each have a respective name; and
in response to determining that the name of the third net has a same priority as the name of the fourth net, prompting for user input selecting either the name of the third net or the name of the fourth net to take priority.

* * * * *

UNITED STATES PATENT AND TRADEMARK OFFICE
CERTIFICATE OF CORRECTION

PATENT NO. : 8,756,539 B2  Page 1 of 1
APPLICATION NO. : 12/533946
DATED : June 17, 2014
INVENTOR(S) : Elliott et al.

It is certified that error appears in the above-identified patent and that said Letters Patent is hereby corrected as shown below:

In the Claims:

Claim 1, Column 10, Line 3, please delete "displaying the updated names;" and substitute -- displaying the one or more updated names; --;
Claim 10, Column 10, Line 62, please delete "modifying a" and substitute -- modifying the --;
Claim 10, Column 11, Line 13, please delete "name of second net has higher" and substitute -- name of the second net has a higher --;
Claim 14, Column 11, Line 43, please delete "net has higher priority" and substitute -- net has a higher priority --;
Claim 14, Column 11, Line 44, please delete "rules defines" and substitute -- rules that defines --;
Claim 15, Column 11, Lines 49-50, please delete "assignment off-page" and substitute -- assignment, off-page --;
Claim 16, Column 11, Line 52, please delete "wherein the user input" and substitute -- wherein receiving the user input --;
Claim 18, Column 12, Line 9, please delete "system, for" and substitute -- system for --;
Claim 18, Column 12, Line 11, please delete "processor; and" and substitute -- processors; and --; and
Claim 18, Column 12, Lines 14-15, please delete "processors implement:" and substitute -- processors to implement: --.

Signed and Sealed this
Ninth Day of September, 2014

Michelle K. Lee
*Deputy Director of the United States Patent and Trademark Office*